(12) United States Patent
Lorenz

(10) Patent No.: US 7,044,021 B2
(45) Date of Patent: May 16, 2006

(54) STEERING DEVICE FOR A MOTOR VEHICLE

(75) Inventor: Christian Lorenz, Leidersbach (DE)

(73) Assignee: TRW Automotive Safety System GmbH, Aschaffenburg (DE)

( * ) Notice: Subject to any disclaimer, the term of this patent is extended or adjusted under 35 U.S.C. 154(b) by 124 days.

(21) Appl. No.: 10/316,622

(22) Filed: Dec. 11, 2002

(65) Prior Publication Data
US 2003/0110881 A1    Jun. 19, 2003

(30) Foreign Application Priority Data
Dec. 13, 2001    (DE) .......................... 201 20 221 U

(51) Int. Cl.
B62D 1/04 (2006.01)
B62D 1/06 (2006.01)
G05G 1/10 (2006.01)
G05G 1/04 (2006.01)

(52) U.S. Cl. .................... 74/552; 318/489; 318/488
(58) Field of Classification Search ................ 74/552; 180/315, 402; 274/502; 318/489, 488
See application file for complete search history.

(56) References Cited

U.S. PATENT DOCUMENTS

| | | | |
|---|---|---|---|
| 6,147,416 A * | 11/2000 | Mitsuzuka ................ | 307/10.1 |
| 6,153,996 A | 11/2000 | Nigrin et al. .............. | 318/489 |
| 6,402,196 B1 * | 6/2002 | Nicot ........................ | 280/771 |
| 6,491,128 B1 | 12/2002 | Lehmann et al. .......... | 180/315 |
| 6,499,377 B1 * | 12/2002 | Schuler ..................... | 74/558 |
| 6,622,591 B1 * | 9/2003 | Albayrak et al. .......... | 74/552 |
| 6,644,145 B1 * | 11/2003 | Albayrak et al. .......... | 74/552 |
| 6,736,026 B1 * | 5/2004 | Lorenz ...................... | 74/552 |
| 6,752,039 B1 * | 6/2004 | Kreuzer et al. ............ | 74/552 |
| 2004/0025624 A1 * | 2/2004 | Kreuzer ..................... | 74/552 |

FOREIGN PATENT DOCUMENTS

| | | | | |
|---|---|---|---|---|
| EP | 0414300 A1 * | 8/1990 | .................. | 74/552 |
| EP | 1046572 | 10/2000 | | |
| JP | 2000-301998 | * 10/2000 | .................. | 74/552 |
| WO | WO 99/12791 | 3/1999 | | |

* cited by examiner

Primary Examiner—Vinh T. Luong
(74) Attorney, Agent, or Firm—Tarolli, Sundheim, Covell & Tummio L.L.P.

(57) ABSTRACT

A steering device for a motor vehicle comprises a stationary skeleton which has an essentially arc-shaped skeleton section, and an actuation member that is movably mounted on the skeleton section and that has two contact sections essentially opposite from each other. The actuation member surrounds the skeleton section with a ring-shaped cross section and extends between the contact sections continuously along the arc-shaped skeleton section.

11 Claims, 4 Drawing Sheets

STEERING DEVICE FOR A MOTOR VEHICLE

TECHNICAL FIELD

The present invention relates to a steering device for a motor vehicle.

BACKGROUND OF THE INVENTION

There are known steering devices which comprise a stationary skeleton and an actuation member that is movably mounted on the skeleton. For some time now, due to reasons of both safety and convenience, more and more devices for actuating various vehicle functions are being arranged directly on the steering wheel so that the driver is no longer forced to take his/her hand off the steering wheel to operate such functions. The transmission of electric signals generated on a rotatable steering wheel to the actuating elements that are arranged in a stationary position on the car body, however, is not unproblematic, especially when a large number of signals has to be transmitted. Therefore, stationary or virtually stationary steering devices have been proposed in which the mechanical coupling between the steering device and the steering linkage has been replaced by a measurement transducer on the steering device and by an actuator on the steering linkage. Such steering devices can dispense with the usual maximum of two-and-a-half to four revolutions of the steering wheel to reach the maximum wheel angle position, and the actual travel distance for the actuation of the steerable wheels can be limited to an angle of rotation of 30° or less. As a result, the transmission of a large number of signals no longer poses a problem since the actuation devices can be arranged on parts of the steering device that are configured so as to be stationary relative to the car body. This greatly simplifies the wiring layout needed to make an electrical connection between the actuation devices and the stationary parts.

A mechanical uncoupling and electric transmission of the steering command to the steerable wheels is also necessary if modem safety systems are to effectuate driver-independent vehicle stabilization and if an influence is to be exerted on the adjustment angle of the steerable wheels.

EP-A-1 046 572 describes a steering device with a non-rotatable frame that has an axis of symmetry and two arc-shaped guide sections, a pair of handles that are coupled to each other via cable pulls and mounted on the guide sections so as to move in the same direction and that can be moved to a limited extent relative to the axis of symmetry, and it also describes a measurement transducer for generating an electric or electronic signal that serves to determine the position of the two handles relative to the frame.

WO-A 99/12791 relates to a steering device for a motor vehicle with an actuation member for initiating a steering movement and a steering linkage for transmitting the steering movement to the wheels, the actuation member consisting of a non-rotatable steering wheel the rim of which contains a band-shaped or chain-like actuation ring that is movable relative to the rim, and a measurement transducer for generating an electric or electronic position signal for the actuation ring. The steering linkage is controlled by an actuator that can be controlled by an electric or electronic regulating devices as a function of the position signal.

The present invention provides a steering device that is less complex in design and that can consequently be manufactured more cost-effectively.

BRIEF SUMMARY OF THE INVENTION

According to the invention, a steering device for a motor vehicle comprises a stationary skeleton which has an essentially arc-shaped skeleton section, and an actuation member that is movably mounted on the skeleton section and that has two contact sections essentially opposite from each other. The actuation member surrounds the skeleton section with a ring-shaped cross section and extends between the contact sections continuously along the arc-shaped skeleton section.

The skeleton can be made in particular of sheet metal, plastics, diecast magnesium, diecast aluminum, polyurethane or fiber-reinforced polyurethane.

The steering device preferably comprises a measurement transducer for generating an electric or electronic signal, said measurement transducer comprising sensors of a path measuring system which are arranged on the arc-shaped skeleton section and detect the movement of the actuation member relative to the skeleton section. Via lines arranged in the skeleton, the measurement transducer can be connected to an electronic unit that picks up the electric or electronic signal generated by the measurement transducer and converts it into a steering signal for controlling an actuator for steerable wheels of a motor vehicle.

Preferably, the essentially arc-shaped skeleton section describes at least a semi-circle. In a particularly preferred embodiment, however, the skeleton section is designed as a full circle and thus has the shape of a conventional steering wheel.

The actuation member can be made up of segment sections joined to each other. Advantageously, however, the actuation member is made up of half-shells joined to each other, thus facilitating its production. The actuation member can be made of the materials known for conventional steering wheels such as wood, leather, plastics, polyurethane, metal or a combination of these materials.

The skeleton section and the actuation member together can have bearing properties. In an advantageous manner, however, between the skeleton section and the actuation member, there is a bearing element that can be configured as a sliding bearing or a roller bearing.

It is particularly preferred that the actuation member is configured as a conventional steering wheel rim that is then rotatably mounted on the circular skeleton section. In this manner, a conventional steering wheel is simulated, which allows electronically assisted steering.

If the steering device according to the invention has a skeleton section that is unsymmetrical with respect to rotation, then the actuation member is preferably made of a flexible material in order to optionally allow a non-circular steering motion in combination with the bearing elements.

In order to define a position for driving straight ahead, the contact sections for the hands of the driver can be optically or tactilely distinguished from the other areas of the actuation member.

Finally, the actuation member of the steering device according to the invention can have a cutout, the skeleton section fitting into this cutout and closing it. This embodiment is especially preferred when the steering device according to the invention is meant to simulate a conventional steering wheel, in order to increase acceptance on the part of the customers. In conventional steering wheels, a skeleton section configured as a full circle is connected to a steering wheel hub by means of spokes. The surrounding cutout in the actuation member of the steering device according to the invention corresponds essentially to the thickness of the spokes and thus ensures that the actuation member can be moved freely. The gap created by the cutout outside of the spoke area can be closed by an appropriately shaped boss on the skeleton section, which fits into the cutout. Advantageously, this boss can be somewhat recessed with respect to the cutout in order to reduce the friction between the hand that is turning the actuation member or the steering wheel rim and the stationary skeleton.

In cases of restraint following a car accident, the stationary construction of the steering wheel has proven to be especially advantageous since the steering wheel can be equipped with a stationary airbag module having an asymmetrical airbag, so that a better restraint effect can be achieved that is adapted to the particular accident situation.

In comparison to the known steering devices, which allow electronically assisted steering (steering by wire), the steering device according to the invention has a much simpler construction with fewer moving parts and consequently, it is easier to maintain and can also be manufactured more cost-effectively.

Unlike the solutions known so far, there is no need for devices to couple the handles or other mechanical guides that are going to be incorporated into the steering wheel rim. This is made possible in that, on the one hand, the actuation member according to the invention extends continuously between the contact sections for the driver's hands, thus requiring no additional mechanical coupling and in that, on the other hand, thanks to the ring-shaped bearing of the actuation member on the skeleton, no additional guides need to be provided.

Furthermore, the simulation of a conventional steering wheel increases the acceptance of the new technology of electronically assisted steering on the part of vehicle manufacturers as well as final consumers. In particular, drivers do not have to change their driving habits, since, for example, leaning on the steering wheel does not cause any unwanted steering motions. Finally, the steering device according to the invention allows the use of conventional manufacturing techniques for the skeleton and for the steering wheel rim, which is made separately as the actuation member. Consequently, the steering device is not subject to any limitations in terms of the material and the design.

Further features and advantages will be apparent from the description below.

DETAILED DESCRIPTION OF THE PREFERRED EMBODIMENT

Figure 1:
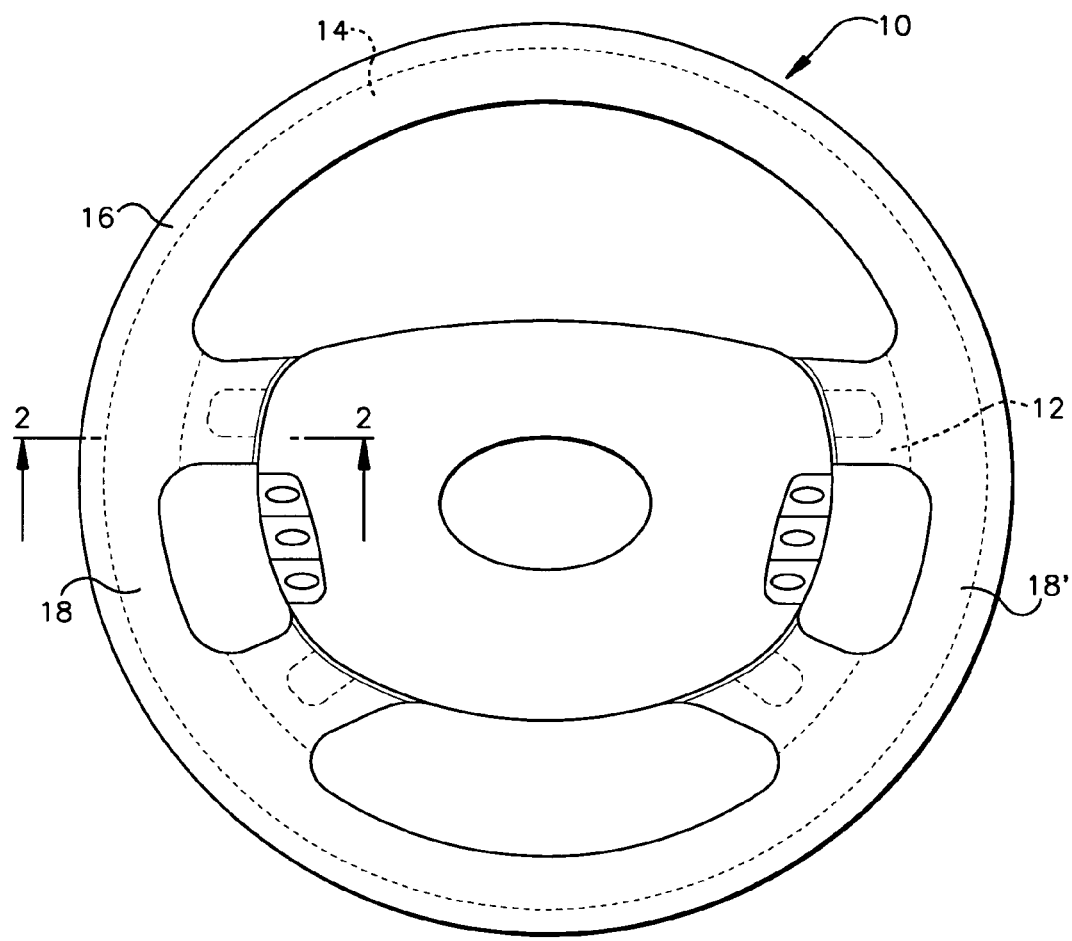
FIG. 1 is a perspective view of a steering device according to the invention and FIG. 2 is a sectional view along the line 2—2 of FIG. 1.
Figure 2:
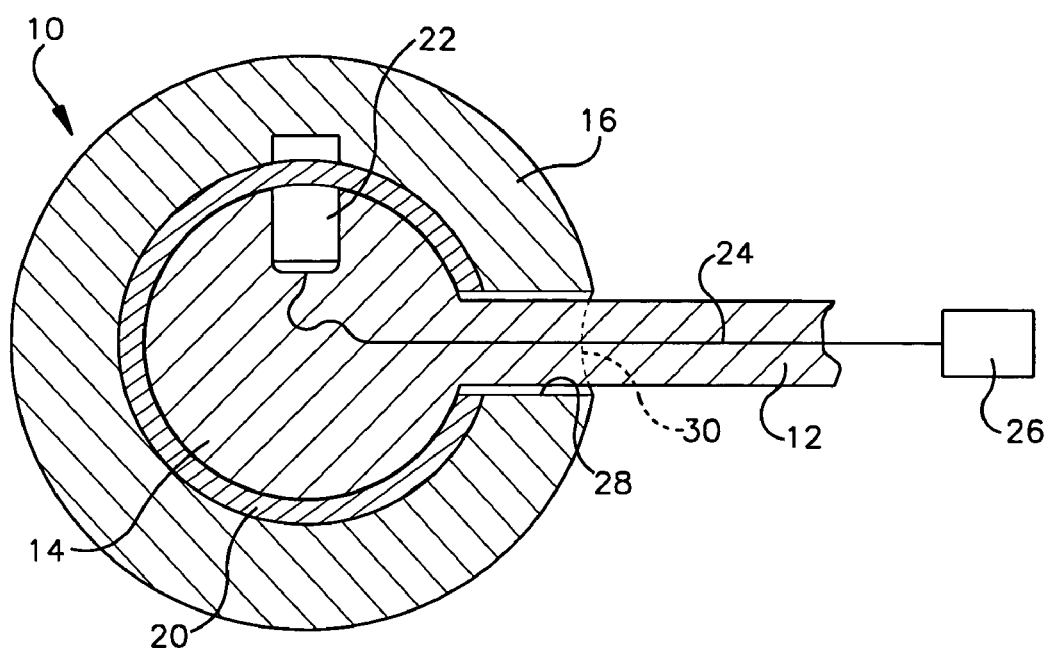
Figure 3:
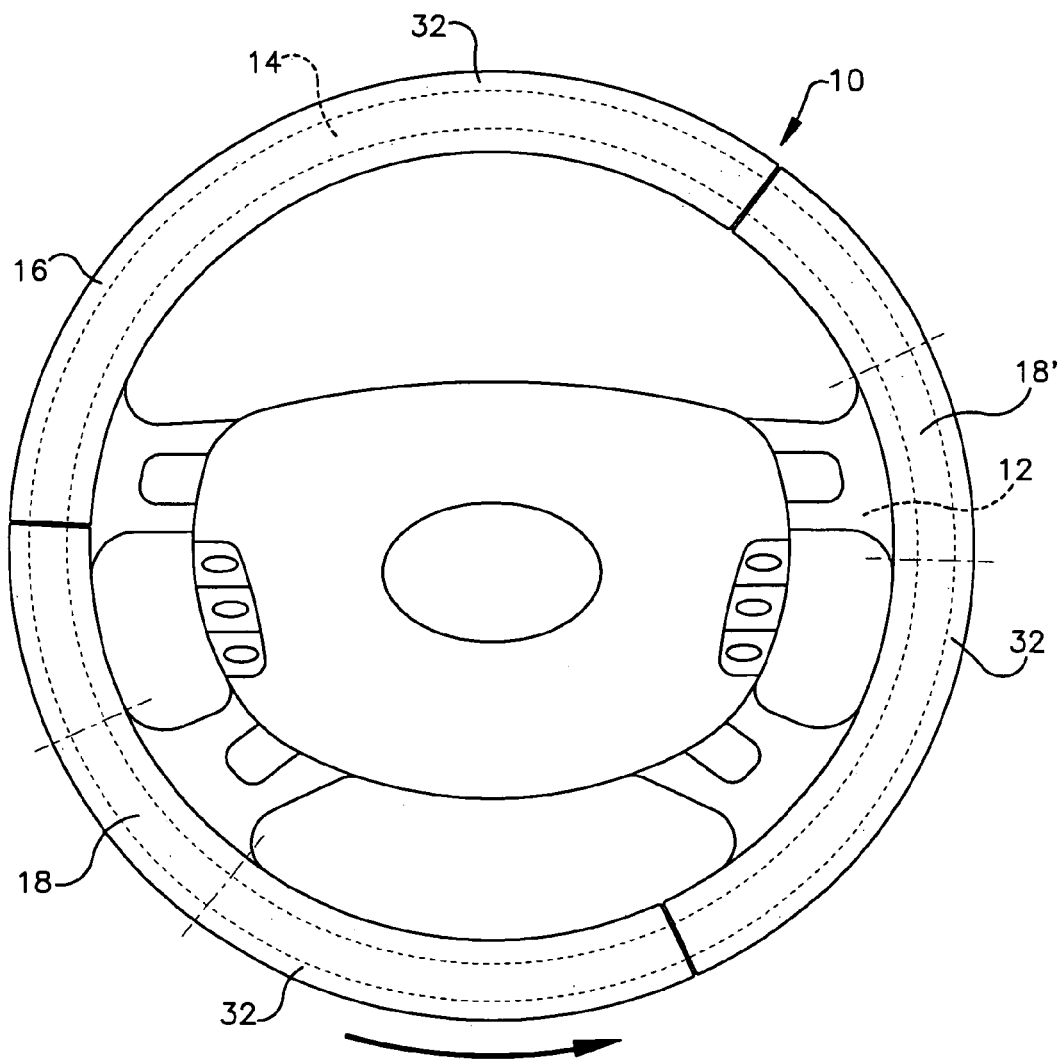
Figure 4:
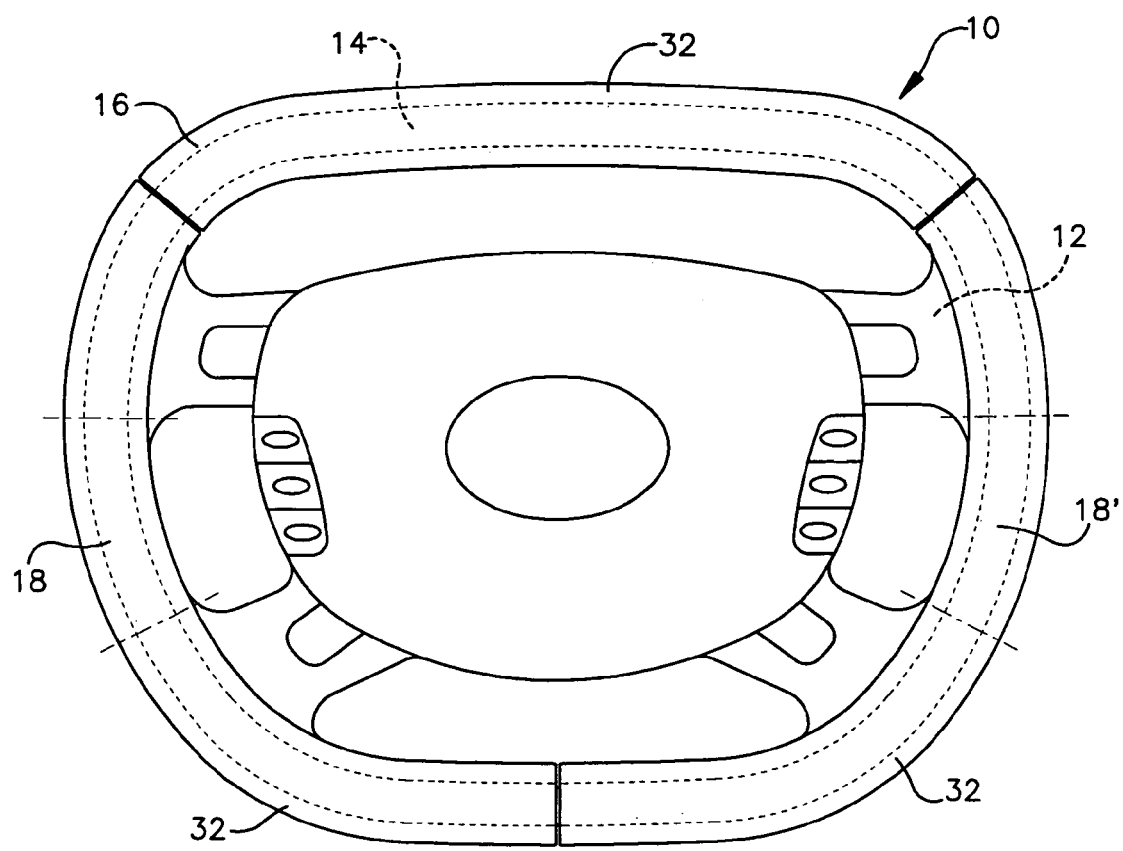

The steering device 10 shown in FIGS. 1 and 2 has a stationary skeleton 12 with an essentially arc-shaped skeleton section 14. In the embodiment shown here, the arc-shaped skeleton section 14 is configured as a full circle. An actuation member 16 is movably mounted on the skeleton section 14. The actuation member 16 has two contact sections 18, 18' that are essentially opposite from each other, and it extends between the contact sections 18, 18' continuously along the arc-shaped skeleton section 14. In the preferred embodiment shown here, the actuation member is configured like a conventional steering wheel rim that can be moved on the stationary skeleton section and thus simulates the turning motion of a conventional steering wheel.

The steering wheel rim or the actuation member 16 surrounds the arc-shaped skeleton section with a ring-shaped cross section so that the driver of the vehicle can firmly grip the steering device on the contact sections 18, 18' in the familiar manner. Therefore, the driver does not have to actuate hard-to-access handles or inserts in the steering wheel rim.

Between the actuation member 16 and the arc-shaped skeleton section 14, there is preferably provided a bearing element 20, for example a sliding bearing or a roller bearing. However, the bearing element 20 can be dispensed with if the combination of actuation member 16 and skeleton section 14 itself has bearing properties.

The motion of the actuation member 16 relative to the arc-shaped skeleton section 14 is detected by the sensors 22 of a path measuring device situated between the actuation member 16 and the skeleton section 14. The electric or electronic signal generated by the sensors is transmitted via lines 24 located in the skeleton 12 to an electronic unit 26 in the vehicle that picks up the signal and converts it into a steering signal for controlling an actuator in order to adjust steerable vehicle wheels (not shown here).

The steering wheel rim or actuation member 16 that annularly surround the arc-shaped skeleton section 14 is provided with a cutout 28 in which the spoke area of the skeleton 12 or a boss 30 formed on the arc-shaped skeleton section fits. The boss 30 closes off the cutout 28 and is preferably slightly recessed with respect to the surface of the actuation member 16 or of the steering wheel rim. In this manner, when the steering wheel rim or the actuation member 16 is gripped, friction between the driver's hand and the steering wheel skeleton 12 or the arc-shaped skeleton section 14 is avoided.

The steering device according to the invention has the same appearance as a conventional steering wheel and can be used analogously to a conventional steering wheel. This increases the acceptance by both the final customers and the automobile manufacturers. Moreover, the same materials can be used to manufacture the steering device according to the invention as can be used for the production of conventional steering wheels. Thus, for example, the actuation member 16 or the steering wheel rim can be made of familiar materials such as wood, plastics, polyurethane and metal as well as combinations of these materials. In order to make the steering wheel rim or the actuation member 16, prefabricated half-shells or segment sections made of these materials can be joined together.

The steering device according to the invention, however, is not limited to circular embodiments corresponding to the conventional steering wheels. It is also possible to use versions that are unsymmetrical with respect to rotation. In this case, the actuation member is preferably made of a flexible material in order to allow non-circular motions.

The invention claimed is:

1. A steering device for a motor vehicle, said steering device comprising a stationary skeleton which has an essentially arc-shaped skeleton section, an actuation member that is movably mounted on said skeleton section and that has two contact sections essentially opposite from each other, said actuation member completely surrounding said skeleton section with a ring-shaped cross section in a plane perpendicular to said arc-shaped skeleton section and extending between said contact sections continuously along said arc-shaped skeleton section.

2. The steering device according to claim 1, wherein said skeleton is made of one of sheet metal, plastics, diecast magnesium, diecast aluminum, polyurethane and fiber-reinforced polyurethane.

3. The steering device according to claim 1, further comprising a measurement transducer for generating an electric or electronic signal, said measurement transducer comprising sensors of a path measuring system which are arranged on said arc-shaped skeleton section and detect a movement of said actuation member relative to said skeleton section.

4. The steering device according to claim 3, wherein, via lines arranged in said skeleton, said measurement transducer is connected to an electronic unit that picks up said electric or electronic signal generated by said measurement transducer and converts said electric or electronic signal into a steering signal for controlling an actuator for steerable wheels of a motor vehicle.

5. The steering device according to claim 1, wherein said arc-shaped skeleton section describes at least a semi-circle.

6. The steering device according to claim 5, wherein said arc-shaped skeleton section comprises a closed loop and said actuation member is configured as a steering wheel rim.

7. The steering device according to claim 1, wherein the material for said actuation member is selected from the group consisting of wood, leather, plastics, polyurethane, metal and any combination thereof.

8. The steering device according to claim 1, wherein said actuation member is made of a flexible material.

9. The steering device according to claim 1, wherein said actuation member has a surrounding cutout, said skeleton section fitting into and closing said cutout.

10. A steering device for a motor vehicle, said steering device comprising a stationary skeleton which has an essentially arc-shaped skeleton section, an actuation member that is movably mounted on said skeleton section and that has two contact sections essentially opposite from each other, said actuation member surrounding said skeleton section with a ringshaped cross section and extending between said contact sections continuously along said arc-shaped skeleton section, wherein a bearing element is provided between said skeleton section and said actuation member.

11. The steering device according to claim 10, wherein said bearing element is one of a sliding bearing and a roller bearing.

* * * * *